UNITED STATES PATENT OFFICE.

WILLIAM ALFRED PEARN AND FRANK PEARN, OF WEST GORTON, MANCHESTER, ENGLAND.

MACHINE FOR MILLING, FACING, AND OTHER METAL-CUTTING OPERATIONS.

941,269. Specification of Letters Patent. Patented Nov. 23, 1909.

Application filed June 20, 1908. Serial No. 439,602.

*To all whom it may concern:*

Be it known that we, WILLIAM ALFRED PEARN and FRANK PEARN, subjects of the King of Great Britain and Ireland, residing at West Gorton, Manchester, England, have invented certain new and useful Improvements in Machines for Milling, Facing, and other Metal - Cutting Operations, of which the following is a specification.

This invention relates to machines for milling, facing, boring, drilling and other metal cutting operations, our object being to improve the construction of such machines and render the same more effective for service, and capable of being more readily set or adjusted for the performance of the required operations on work pieces of various dimensions.

Figure 1:
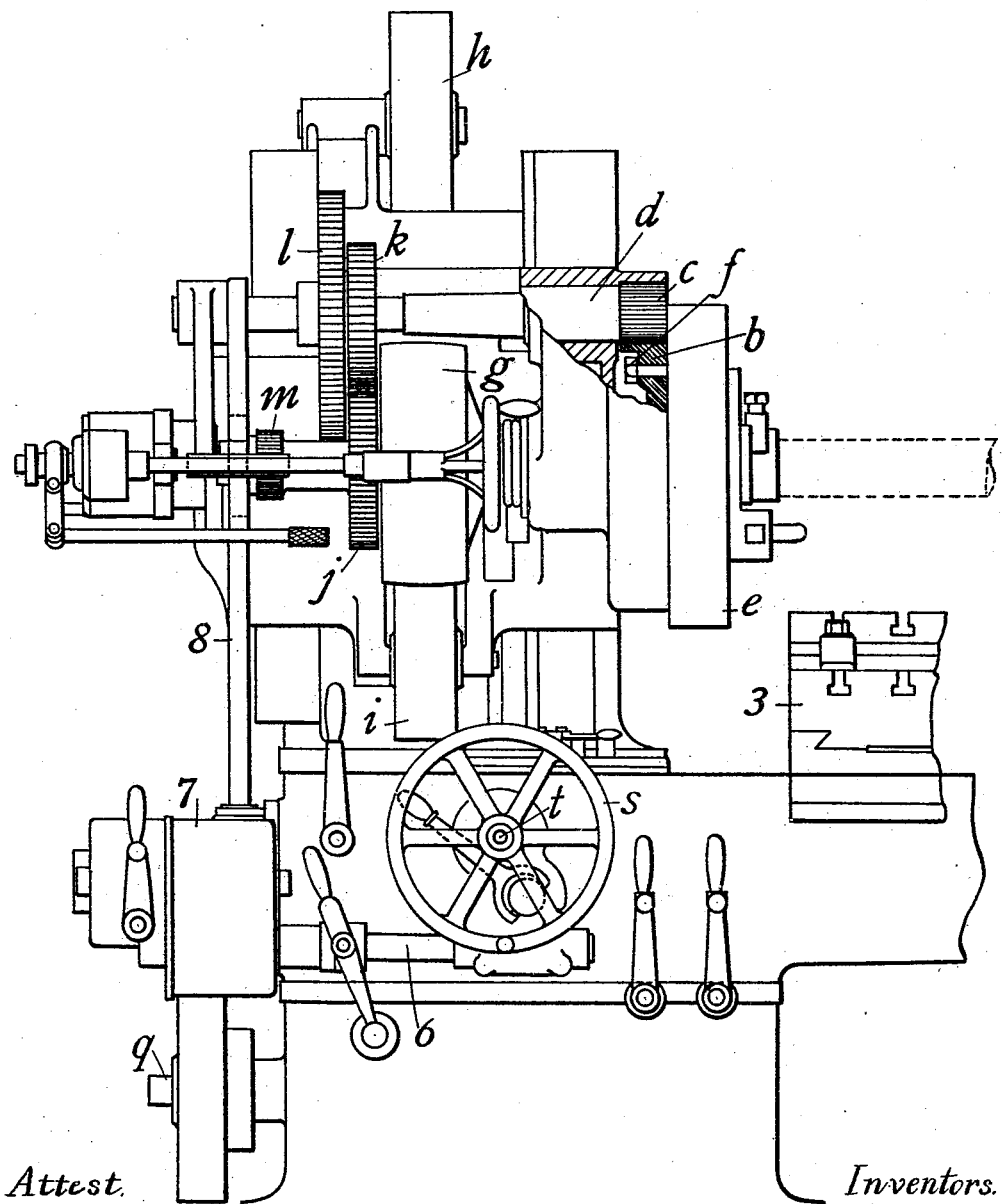
Figure 2:
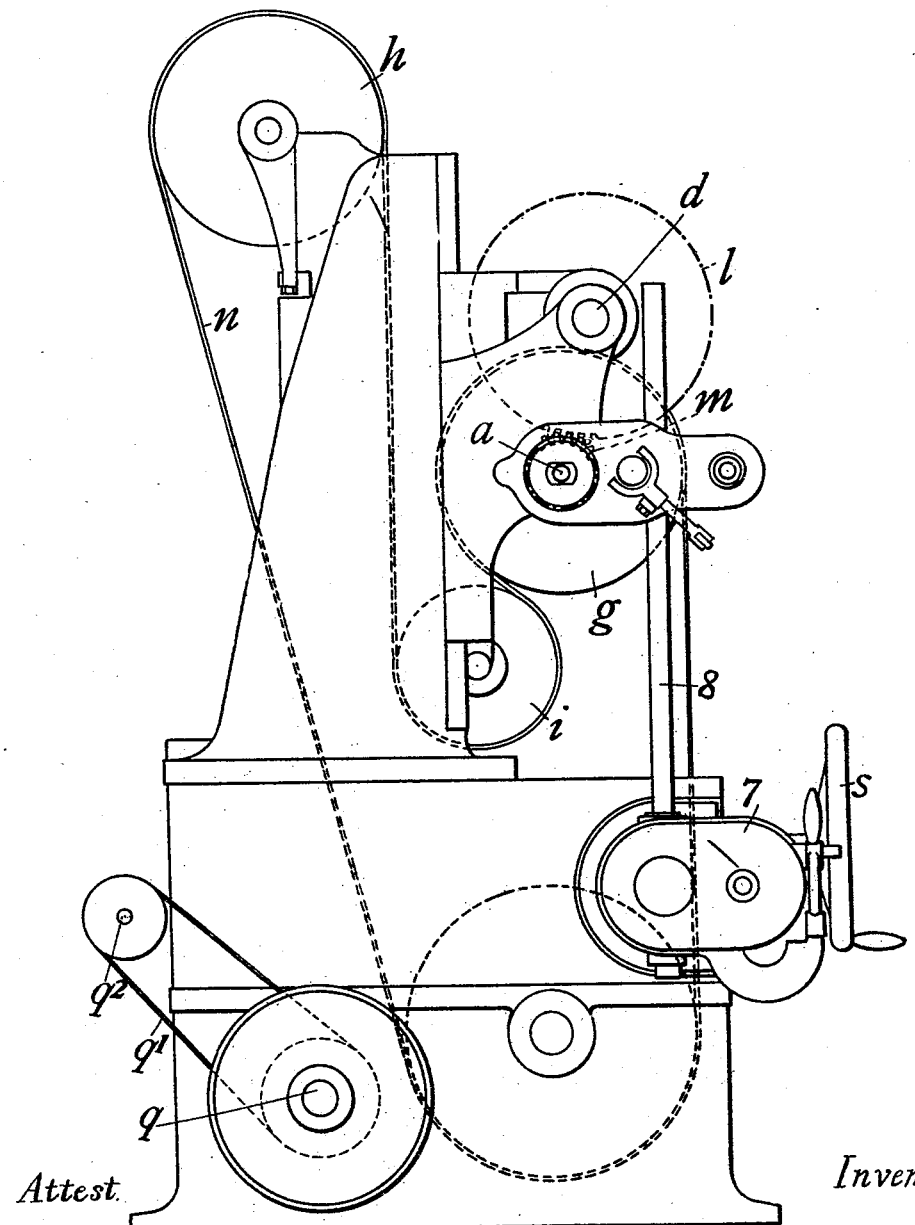
Figure 3:
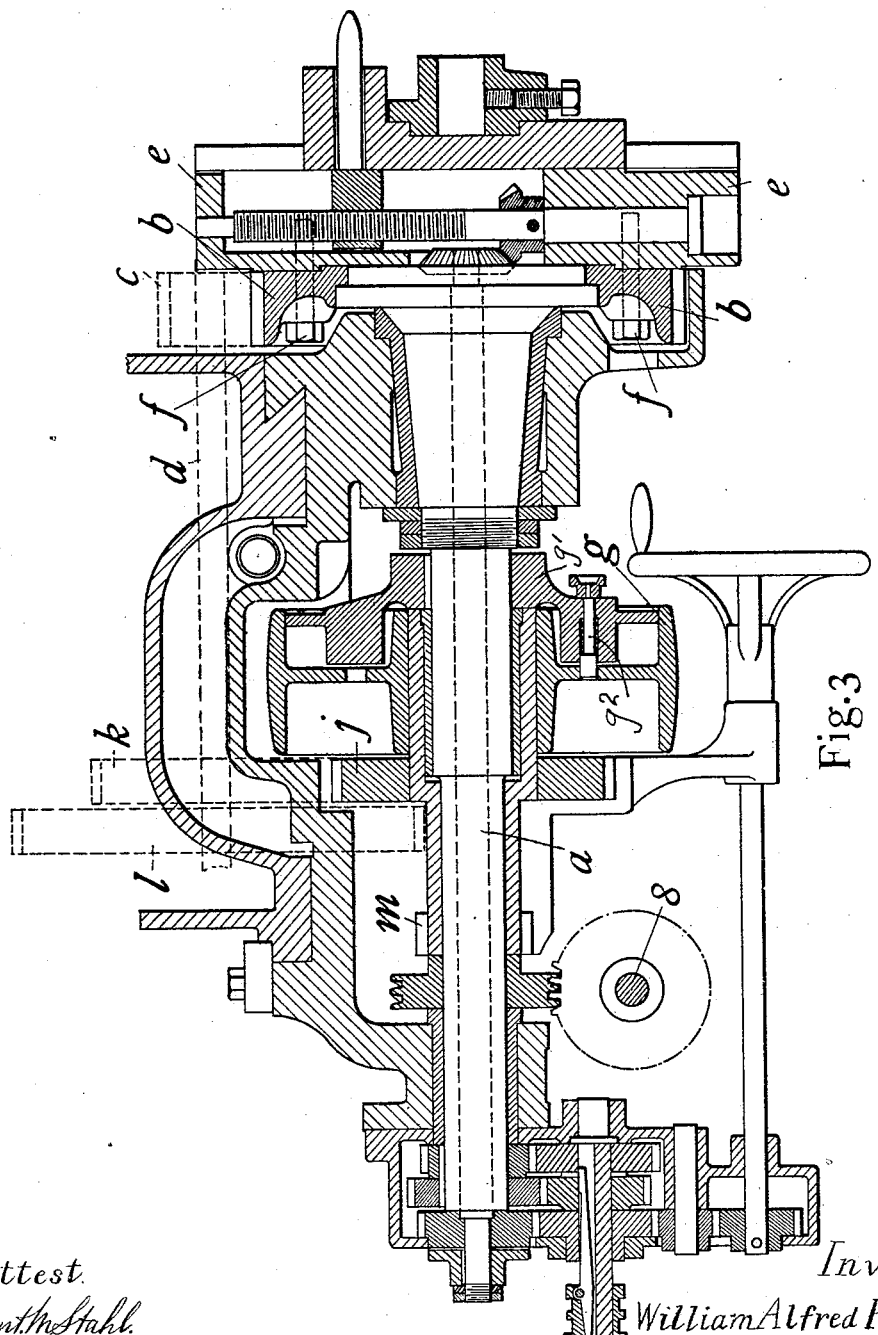
Figure 4:
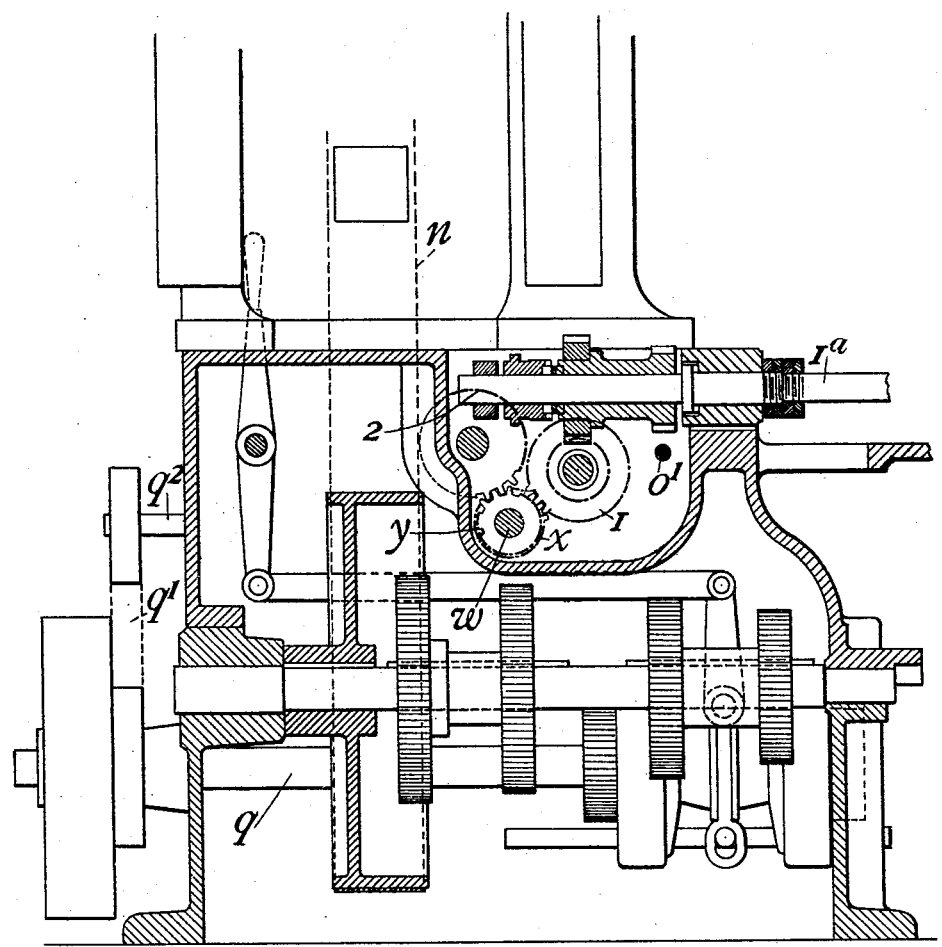
Figure 5:
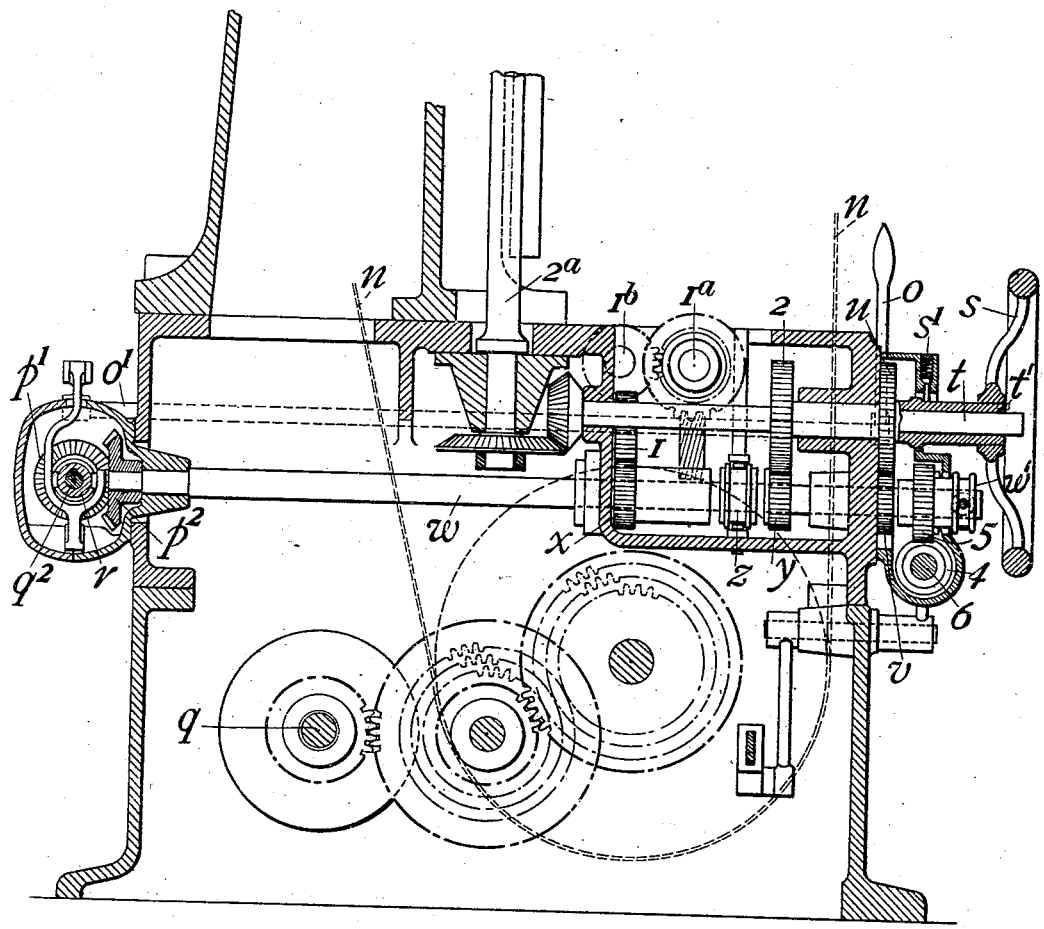
Figure 6:
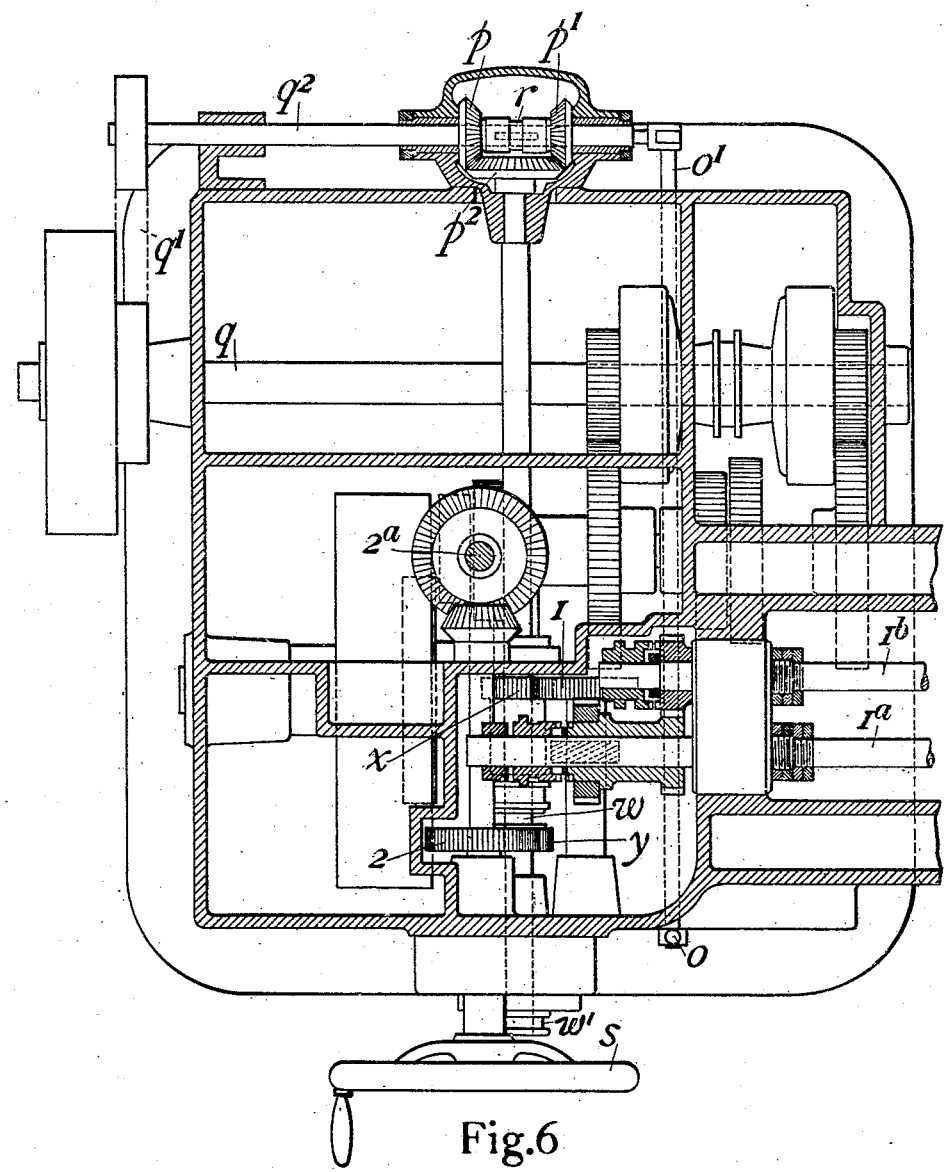

Referring to the six accompanying sheets of explanatory drawings:—Figure 1 is a side elevation (with part in section) and Fig. 2 an end elevation of one of our improved machines. Fig. 3 is a sectional plan through the cutter head. Fig. 4 is a sectional side elevation, Fig. 5 a sectional end elevation and Fig. 6 a sectional plan showing the mechanism for obtaining rapid movements of the work table and also the vertical movements of the cutter head. Figs. 1 and 2 are drawn to a smaller scale than the remaining figures; Fig. 3 is drawn to a larger scale than Figs. 4 and 5.

The same reference characters in the different views indicate the same parts.

In the construction of a machine in accordance with our invention and as illustrated in the drawings, we secure to the operative end of the mandrel or main spindle $a$ of the vertically sliding head-stock or cutter head, a toothed wheel $b$ into which meshes a driving pinion $c$ formed with or carried by the back gear spindle $d$ of the said sliding head. The aforesaid toothed wheel $b$ is adapted to enter into socket and spigot or other detachable connection with the facing or other tool holder as $e$ that may be employed, according to the particular process or operation to be performed by the machine. The required tool holder can thus be readily connected and disconnected with the spur or toothed wheel $b$, and it is detachably secured thereto by bolts, screw studs as $f$ or otherwise.

The driving pulley $g$ of the mandrel or main spindle $a$ of the sliding head is fixed as is shown, to the portion of the said spindle between the bearings formed in the head, and by disposing belt guide pulleys as $h$ and $i$ respectively above and below the said driving pulley $g$ a good arc of belt driving contact is obtained on the said pulley in a compact and convenient manner.

In the particular machine illustrated three speed changes are provided for on the sliding head itself. For one speed the main spindle $a$ is driven directly from the driving pulley $g$ mounted thereon, the back gear spindle $d$ being then inoperative. The necessary direct driving connection between the spindle $a$ and pulley $g$ is obtained through the carrier element $g'$ which carries a spring bolt $g^2$ adapted to detachably engage one of a number of apertures formed around the web of $g$. Another speed is obtained by the indirect driving of the spindle $a$ from the pulley $g$ by way of the gear wheels $j$ and $k$ and the aforesaid gears $b$ and $c$. A third speed is obtained by disengaging the wheels $j$ and $k$ and engaging the wheels $l$ and $m$. The said engagement and disengagement of the respective gears is effected in any convenient and well known manner, such as by sliding the wheels $k$ and $l$ together along the spindle $d$.

In the illustration at Fig. 3 the back gear spindle $d$ and its gear wheels are shown by dotted lines at one side of the main spindle $a$; the true position of the said spindle $d$ is above the spindle $a$ as is shown at Figs. 1 and 2. The change speed driving mechanism at the base of the machine may, as in the example illustrated, comprise an all gear drive; or instead of such a drive speed cones may be employed in combination with single or other reduction gear. With the all gear drive the required speed changes are effected preferably by sliding the gear wheels along their respective shafts or spindles; or the wheels may be constantly in mesh and rendered operative or inoperative as required by sliding or other clutches. The belt $n$ employed to transmit from the gear at the base of the machine to the driving pulley $g$ aforesaid on the mandrel $a$ of the sliding head, serves also to absorb or take up any chatterings or vibratory movements which might otherwise be conveyed from the said speed changing mechanism to the driving pulley $g$.

For readily and conveniently effecting rapid movements of the work table both in longitudinal and crosswise directions, and also like vertical movements of the sliding head, we provide power or self-acting mechanism which is preferably adapted to be put in and out of action by means of a hand lever as $o$. Such quick feed mechanism comprises sliding or clutch controlled bevel wheels as $p$ $p'$ $p^2$ arranged to transmit the required motion to the feed spindles, leading screws or equivalent elements of the work table and the vertically sliding head. The said bevel wheels are driven from the driving or first motion shaft $q$ at the base of the machine through the medium of a belt $q'$. By the said belt the bevel pinion shaft $q^2$ is kept constantly rotating while the machine is running, but by means of the clutch $r$ operated by the aforesaid hand lever $o$ acting through the rock shaft $o'$ either the bevel pinion $p$ or the bevel pinion $p'$ may be put into operative connection with the shaft $q^2$ according to the direction in which it is required to rotate the bevel wheel $p^2$ for effecting the rapid movements aforesaid. On placing the clutch $r$ in its mid position no motion is imparted to $p^2$.

Finer or slower feed movements of the work table and the sliding head are obtained through the operation of a single hand wheel $s$ arranged with any suitable and ordinary clutch devices for putting the said wheel into driving connection with the required transmitting elements which transmit either the self-acting or the hand driven feed movements in the following manner:—

The hand wheel $s$ is fixed upon a sliding sleeve $t'$ revoluble on the spindle $t$ (Fig. 5) and having formed with or secured to it the spur wheel $u$ gearing with the wheel $v$ secured to the spindle $w$ to which is fixed the aforesaid bevel wheel $p^2$. Upon the same spindle $w$ the wheels $x$ and $y$ are freely mounted and between them is disposed a double ended sliding clutch $z$ revoluble with the said spindle. The wheel $x$ gears with a wheel $l$ rotatable with a spiral gear actuating the feed screw shafts $1^a$ $1^b$ of the work tables. The wheel $y$ gears with the wheel 2 fixed upon the spindle $t$ which transmits motion by means of bevel wheels to the feed screw shaft $2^a$ of the vertical sliding head. Thus when the clutch $z$ is engaged with the wheel $y$, and the hand lever $o$ (controlling bevel gear clutch $r$) operated, motion is automatically imparted to the vertical head, and when the clutch $z$ is engaged with the wheel $x$, motion is similarly imparted to the work table 3. The said motions are variable in direction by means of the clutch $r$ between the bevel wheels or pinions $p$ $p'$.

When the hand lever $o$ and the clutch $r$ operated thereby are in mid-position the spindle $w$ receives no motion from the bevel gears $p$ $p'$ $p^2$ forming part of the automatic or power feed mechanism but is free to revolve under the action of the hand wheel $s$, from which motion is transmitted by means of the aforesaid gear wheels $u$ and $v$. Thus by varying the position of clutch $z$ as before described, motion may be imparted to the vertical sliding head or the work tables at will, either by means of the hand wheel $s$ or by power transmitted through the belt $p$. When the aforesaid power feed is in operation, the hand wheel $s$ may be withdrawn by sliding it upon the shaft $t$, together with the gear wheel $u$, thus removing the objection and danger of a rapidly revolving projecting piece. The hand wheel $s$ and the gear wheel $u$ are retained in their service and out of service positions respectively, by means of a spring catch pin or the like formed in the guard $s'$ and adapted to engage the opposite ends of a shoulder formed on the sliding sleeve to which the hand wheel is fixed. When either the hand or power feed motions aforesaid are employed, the self-acting graduated speeds (obtained by driving down from the main spindle $a$ of the sliding head as hereinafter described) are thrown out of gear by means of the outer clutch $w'$ at the outer end of the shaft $w$.

From the shafts $1^a$, $1^b$ and $2^a$ the required motions of the work table 3 and also of the vertically sliding head or head-stock are obtained through any ordinarily arranged gearing.

Instead of driving the shaft $w$ in the manner aforesaid, it may be driven (when varying or graduated rates of feed are required), by means of the worm 4 engaging the worm wheel 5 (Fig. 5) mounted upon $w$ and adapted to be clutched thereto as required by the outer clutch $w'$. The said worm 4 is secured to a spindle 6 (Fig. 1) which is driven from the gear box 7 (Figs. 1 and 2) to which motion is transmitted down from the spindle $a$ of the sliding head by the skew gear driven vertical spindle 8 (Figs. 1, 2 and 3).

The respective motions or driving mechanisms of the complete machine are controlled by suitably arranged clutches or their equivalent.

Having thus described our invention what we claim as new and desire to secure by Letters Patent is:—

1. In machines for milling and other metal cutting operations, the combination with a mandrel and a vertically movable headstock supporting said mandrel, of a toothed wheel secured to the operative end of said mandrel, a tool holder in direct engagement with said toothed wheel, means for detachably securing the said tool holder to the toothed wheel, reduction gear engaging the toothed wheel, a belt pulley, and means for driving the mandrel from the pulley both directly through the said reduction gear and toothed wheel, as set forth.

2. In machines for milling and other metal cutting operations, the combination consisting of a mandrel, a vertically movable head-stock supporting the said mandrel, a toothed wheel secured to the operative end of said mandrel, a tool holder in direct engagement with said toothed wheel, means for detachably securing the said tool holder to the toothed wheel, reduction gear engaging the toothed wheel, a belt pulley, means for driving the mandrel from the said pulley both directly and through the said reduction gear and toothed wheel, a work table, and means for moving the said table relatively to the said tool holder, as set forth.

In testimony whereof, we affix our signatures in presence of two witnesses.

WILLIAM ALFRED PEARN.
FRANK PEARN.

Witnesses:
VIVIAN ARTHUR HUGHES,
CHARLES CONRAD.